(12) United States Patent
Kurosaki et al.

(10) Patent No.: US 6,498,842 B2
(45) Date of Patent: Dec. 24, 2002

(54) SWITCHING SYSTEM BETWEEN A CALL CENTER AND PUBLIC NETWORK

(75) Inventors: Kiyoshi Kurosaki; Toshiyuki Saito, both of Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 48 days.

(21) Appl. No.: 09/777,170

(22) Filed: Feb. 5, 2001

(65) Prior Publication Data

US 2002/0048355 A1 Apr. 25, 2002

(30) Foreign Application Priority Data

Oct. 24, 2000 (JP) ........................................ 2000-323708

(51) Int. Cl.⁷ ................................................. H04M 1/00
(52) U.S. Cl. ......................... 379/156; 379/164; 379/162
(58) Field of Search .................................. 379/156, 157, 379/161, 162, 163, 164, 165, 198, 207.01, 212.01, 265.01, 265.11, 265.1, 266.02, 264

(56) References Cited

U.S. PATENT DOCUMENTS 5,095,504 A * 3/1992 Nishikawa et al. ......... 379/162
5,191,604 A * 3/1993 Shigeeda .................... 379/161
5,497,415 A * 3/1996 Kagi .......................... 379/393
5,764,746 A * 6/1998 Reichelt ..................... 379/207
5,933,482 A * 8/1999 Jung .......................... 379/159
5,937,046 A * 8/1999 Lee ............................ 379/156
5,956,395 A * 9/1999 Song ......................... 379/209
5,963,629 A * 10/1999 Jung .......................... 379/156
6,192,120 B1 * 2/2001 Yamagishi et al. ......... 379/215
6,208,729 B1 * 3/2001 Agraharam et al. ........ 379/266
6,314,175 B1 * 11/2001 Jones ......................... 379/229

FOREIGN PATENT DOCUMENTS

JP 04-259157 9/1992

* cited by examiner

*Primary Examiner*—Rexford Barnie
(74) *Attorney, Agent, or Firm*—Katten Muchin Zavis Rosenman

(57) ABSTRACT

A switching system which can easily reconnect a call to an original call path even if an original call state is disconnected at a time of transferring the call to another outside line or extension is presented. In a state where a call path between an outside line (or first line) and a call center (or second line) is formed, the outside line is connected to an outside line transfer destination (or third line) when a transfer demand from the call center to the outside transfer destination is received and the outside line is automatically reconnected to the call center when the call between the outside line and the outside line transfer destination ends.

17 Claims, 3 Drawing Sheets

SWITCHING SYSTEM BETWEEN A CALL CENTER AND PUBLIC NETWORK

BACKGROUND OF THE INVENTION

1. Field of the Invention

The present invention relates to a switching system, and in particular to a switching system to which a call center is connected where a reception service is performed in a telephone system.

A call center in cooperation with a telephone system and a customer's data base for a mail order and a customer support plays an important role in CRM (Customer Relationship Management), and in particular what a convenient service can be offered by the call center to a telephone from a customer is important for a successful business.

2. Description of the Related Art

A call center is generally provided with a plurality of reception desks connected to a switching system with extension lines. There are some cases where operators positioned at each of the reception desks transfer a call with a customer who is a caller from an outside line to another outside line. This is for directly receiving a detailed explanation from an outsourcing company. Specifically, when the call center is outsourced by the outsourcing company such as for a sale of commodities or goods from different companies, and can not attend to a customer's demand for a detailed explanation of the commodities, the outside line transfers to the outsourcing company which is the offer source (request source) of the commodities are performed.

A telephone transferring technology in such a case is described in e.g. the Japanese Patent Application Laid-open No.4-259157.

Namely, an electronic switching system proposed therein is as follows: When a telephone "A" is a transfer source, and transfers a call to another telephone "C" during the call with a telephone "B", and when the telephone "C" is busy, the telephone "A" detects the busy state and automatically returns to the call with the telephone "B" having the line held, after a fixed time elapses. On the other hand, when the telephone "C" of the transfer destination is not busy, the telephones "A" and "C" are mutually connected to enable the call. When the telephone "A" does a hook flash operation, the telephones "A" and "B" are mutually reconnected to assume a call state, so that the telephone "C" is disconnected.

In such a conventional technology, the telephone B which is calling the telephone "A" of the transfer source has to hold the line. If such a technology is applied to the relationship between the above-mentioned call center, customer, and outsourcing company, the call center is obliged to hold the line, so that during that time, the call center can not receive other customers' calls.

On the other hand, if the call center does not hold the line, the call center disconnects the telephone after having transferred the call to the outsourcing company. Therefore, if the customer desires to obtain the explanation of another commodity from the call center after having received the detailed explanation from the outsourcing company, the customer is required to once disconnect the call with the outsourcing company, and to again make a telephone call to the call center.

Thus, from a customer's standpoint, it is desired to determine a commodity to buy after having compared commodities. However, in order to obtain the information of another commodity, it is required to again make a telephone call, resulting in double operations. Also, as an outsourcing company, it has been disadvantageous that there is a possibility of losing customers without having them make a telephone call again.

SUMMARY OF THE INVENTION

It is accordingly an object of the present invention to provide a switching system which is easily reconnected to an original call path even if an original call state is disconnected when the call is transferred to another outside line or extension.

FIG. 1 schematically shows an arrangement of a switching system according to the present invention for achieving the above-mentioned object.

At first, a caller 1 (first outside line) who is a customer is connected to a switch 3 composing a switching system through a public network 2. The switch 3 is further connected to a call center 5 (extension/outside line) under the control of a controller 4. The call center 5 is provided with reception desks 51–5n where operators are respectively located, and manages a reception service of such a company as undertakes outsourcing sales of commodities from a plurality of companies.

If the caller 1 performs a calling operation (calls) in such an arrangement, the call is received at e.g. the reception desk 52 among the reception desks 51–5n in the call center 5 (call state (1)).

When the operator of the reception desk 52 can not satisfactorily answer the questions about the commodities from the caller 1, the transfer thereof to an outside transfer destination (second outside line) 6 which is a development source of the commodities is demanded through the switch 3 and the public network 2, thereby assuming a call state (2) between the caller 1 and the transfer destination 6.

In the call state (2), the controller 4 connected to the switch 3 can detect whether or not the outside transfer destination 6 has disconnected the call (end of call) based on a disconnection signal 7 sent from e.g. the public network 2.

When receiving the disconnection signal 7 from the public network 2 by the call disconnection of the outside transfer destination 6, the controller 4 switches over the call in order that the caller 1 is again connected to the reception desk 52, thereby returning to the above-mentioned call state (1).

Also, as for the reception desk to which the caller 1 is reconnected, the number of the reception desk 52 according to the first call state (1) is preliminarily stored, so that the caller 1 may return to that number. Otherwise, a reception desk (e.g. reception desk 51) may be predetermined to be selected, or any other reception desk may be set to be selected when the selected reception desk is busy at the time of the selection.

Thus, according to the above-mentioned present invention, the caller who is a customer is automatically reconnected to the operator of the reception desk in the switching system. Therefore, the operation of making a telephone call again in order to obtain the information of another commodity with which the outsourcing company deals can be omitted.

Also, in the above example, the caller 1 and the transfer destination 6 are connected with the outside line. Besides this arrangement, another arrangement where all of the caller 1, call center 5, and the transfer destination 6 are connected to the switch 3 with the extension may be adopted.

Namely, if the outside line or the extension are simply referred to as "line", and the first to third lines are supposed to be connected to the switch 3; when the transfer demand from the second line (call center 5) to the third line (transfer destination) is received by the controller 4 in the call state (1) between the first line (caller 1) and the second line, the controller 4 may connect the first line to the third line, and when the call state (2) between the first line and the third line ends, the controller 4 may reconnect the first line to the second line.

When there are a plurality of second lines in this case, the controller may store the number of the second line at the time of the first call, and select either the stored second line or predetermined one of the second lines at the time of the reconnection.

Furthermore, when the selected second line is busy, another arbitrary line which is not busy of these second lines may be selected.

BRIEF DESCRIPTION OF THE DRAWINGS

Throughout the figures, like reference numerals indicate like or corresponding components.

DESCRIPTION OF THE EMBODIMENTS

Figure 1:
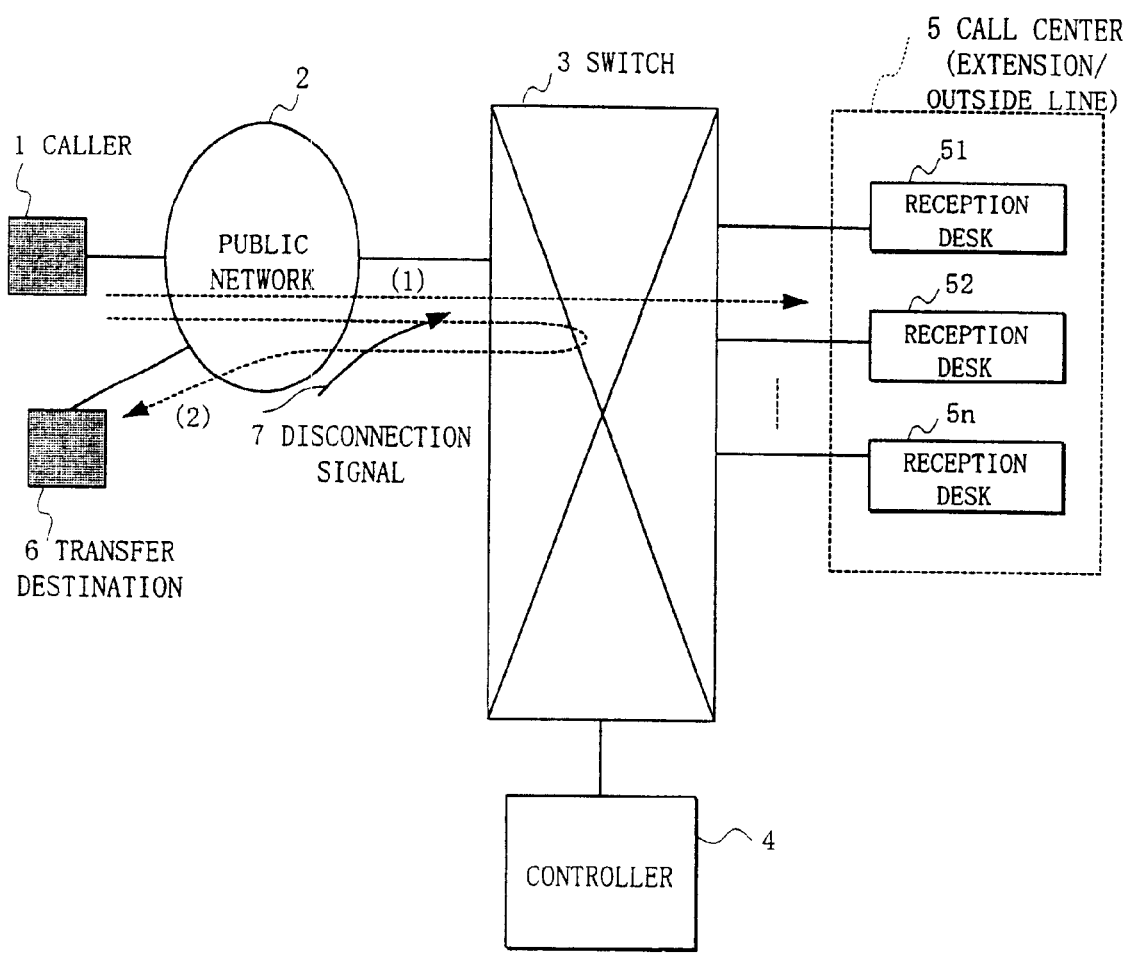
FIG. 1 is a block diagram showing a schematic arrangement of a switching system according to the present invention.
Figure 2:
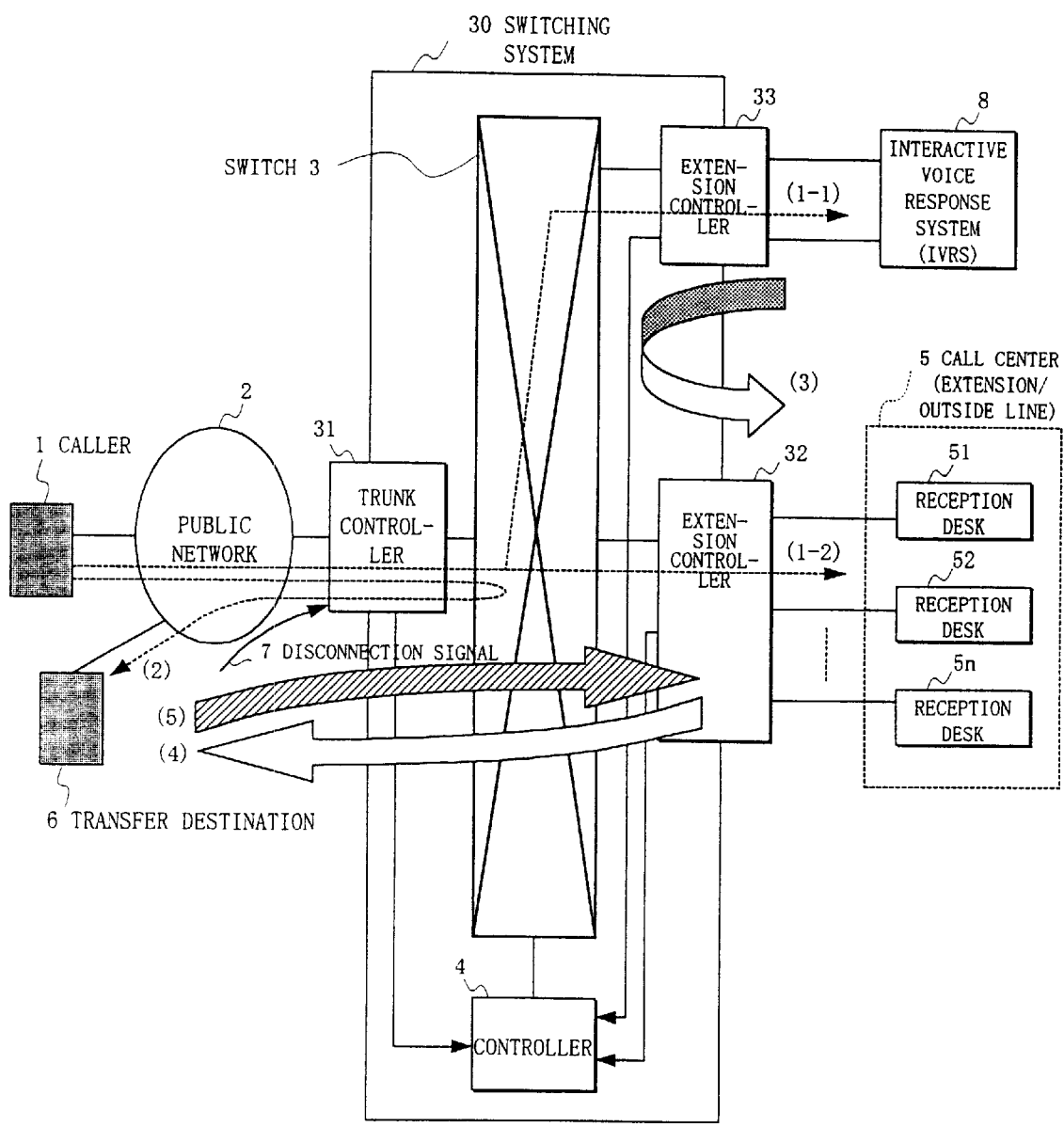
FIG. 2 is a block diagram showing an embodiment of a switching system according to the present invention.

FIG. 2 shows an embodiment of a switching system according to the present invention schematically shown in FIG. 1. In this embodiment, a switching system 30 is provided with a trunk controller 31 between the switch 3 and the public network 2, and is further provided with an extension controller 32 between the switch 3 and the call center 5. In this embodiment, the switch 3 is further connected to an Interactive Voice Response System (IVRS) 8 through another extension controller 33. Also, a monitoring signal is provided to the controller 4 from the trunk controller 31 and the extension controllers 32 and 33. It is to be noted that the extension controllers 32 and 33 can also accommodate an outside line.

Figure 3:
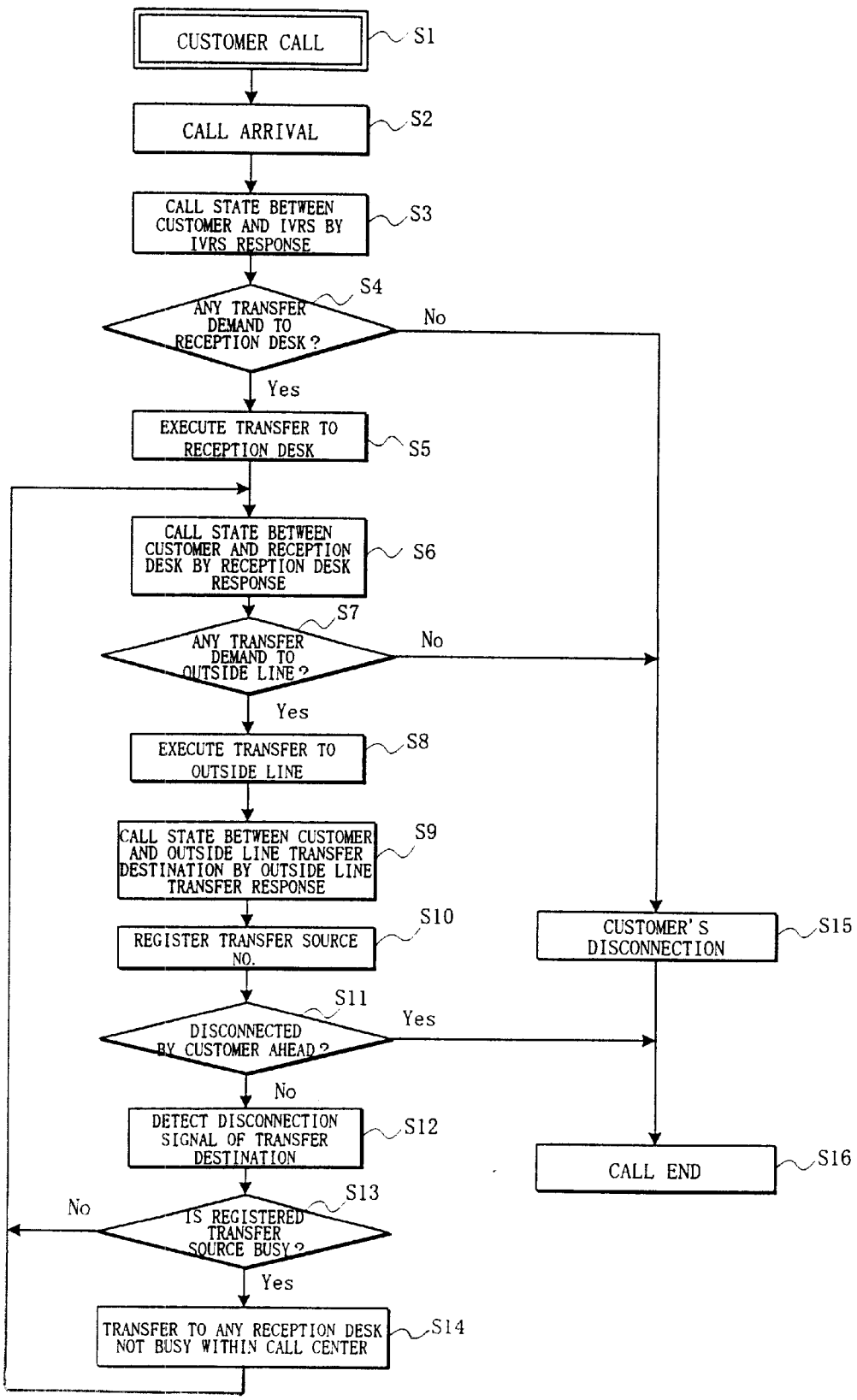
FIG. 3 is a flow chart showing a process algorithm of a controller in a switching system according to the present invention.

The operation of the controller 4 in this embodiment of a switching system according to the present invention is shown in a flow chart of FIG. 3. The operation of the embodiment will now be described by referring to the flow chart.

When a caller 1 as a customer firstly calls (at step S1 in FIG. 3), an incoming trunk controller (not shown) in the trunk controller 31 notifies the arrival of the call to the controller 4 through the public network 2 (at step S2).

Since the first arrival destination of the call is supposed to be the interactive voice response system 8 connected to the extension controller 33 in this embodiment, the controller 4 controls the switch 3 to connect the caller 1 to the interactive voice response system 8. It is to be noted that this interactive voice response system 8 can offer necessary information to the customer, automatically or without any manual operation, at the time of a menu selection by the customer. Therefore, there have been many cases in recent years where the interactive voice response system 8 is used as a primary reception system of the call center 5.

By the response of the interactive voice response system 8, a call state (1-1) between the interactive voice response system 8 and the caller 1 (at step S3) occurs. In this state, the controller 4 determines whether or not there is a transfer demand to any of the reception desks 51–5n in the call center 5 from the interactive voice response system 8 by the monitoring signal from the extension controller 33 (at step S4).

Namely, the transfer demand to directly talk with the operator at the reception desk in the call center 5 is provided to the interactive voice response system 8 when the caller 1 desires to know more in detail the information offered by the interactive voice response system 8. Therefore, the controller 4 monitors whether or not there is a further transfer demand (3) from the interactive voice response system 8.

In the presence of such a transfer demand (3), the controller 4 controls the switch 3 so as to transfer the call to any of the reception desks 51–5n in the call center 5 from the interactive voice response system 8 (at step S5), thereby assuming a call state (1-2) between the caller 1 and e.g. the reception desk 52 (at step S6).

Furthermore, in order to attend the case where the operator of the reception desk 52 can not satisfactorily answer the questions about the commodities from the customer, the controller 4 monitors the presence/absence of an outside line transfer demand (4) from the call center 5 by the monitoring signal from the extension controller 32 (at step S7). In the presence of the outside line transfer demand (4) of the call from the reception desk 52 to the outside transfer destination (outsourcing company) 6 which has originally developed the commodities, the controller 4 controls the switch 3 to execute the outside line transfer through an outgoing trunk controller (not shown) of the trunk controller 31 (at step S8).

Thus, the call state (2) between the caller 1 and the outside transfer destination 6 occurs (at step S9). At this time, the controller 4 preliminarily registers the extension number of the reception desk 52 as a transfer source (at step S10).

In this state, the controller 4 monitors, through the trunk controller 31, the disconnection signal 7 sent from the public network 2 at the time when the outside transfer destination 6 has disconnected the call. When the customer has disconnected the call ahead, the call is ended (at steps S11 and S16). Otherwise, the controller 4 detects the transfer destination disconnection signal 7 (at step S12) to determine, through the extension controller 32, whether or not the reception desk 52 of the transfer source number (extension number) registered at above step S10 is busy (at step S13).

When the registered transfer source is not busy, the controller 4 returns to step S6 and controls the switch 3 so as to perform a call transfer (5) to the reception desk 52, thereby returning to the call state (1-2) between the customer and the reception desk 52. When the registered transfer source is busy, the controller transfers the call to any other reception desk which is not busy within the call center 5 (at step S14) to return to step S6.

Thus, the call state (1-2) between the caller 1 and the call center 5 is again obtained. Then, unless the outside line transfer from the call center 5 is necessary (at step S7), the call is ended by the disconnection of the caller 1 (at steps S15 and S16) in the same way as the case where there is no transfer demand to the reception desk (at step S4).

It is to be noted that the extension number of the transfer source within the call center 5 has been preliminarily registered as shown at step S10 in the above embodiment. However, it is also possible to predetermine the reception desk at the time of restoring the call state (1-2) between the caller 1 and the reception desk. When the reception desk is busy in this case, the transfer to any other reception desk which is not busy only has to be performed.

Also, in the above embodiment, the interactive voice response system 8 is shown as a primary reception system. However, this primary reception system may be the call center 5 itself. Also, it is needless to say that the transfer to the outside transfer destination from the interactive voice response system 8 may be performed.

Furthermore, as the disconnection signal 7 sent from the public network, a disconnection reverse signal can be used in case of an analog line, and a disconnection message can be used in case of a digital line such as ISDN line.

Furthermore, in the above embodiment, the caller 1 and the transfer destination 6 are connected with the outside line through the public network 2. However, as mentioned above, these caller 1 and transfer destination 6 can be connected to the switch 3 with an extension, thereby enabling the connection switchover by the extension between the caller 1, the call center 5 (or interactive voice response system 8), and the transfer destination 6.

As described above, a switching system according to the present invention is arranged such that in a state where a first outside line (or first line) and an extension/outside line (or second line) form a current call path, the first outside line is connected to a second outside line (or third line) when a transfer demand from the extension/outside line to the second outside line is received, and the extension/outside line is reconnected to the first outside line when a call between the first and the second outside lines ends. Therefore, a caller who is a customer is automatically reconnected to a reception desk operator or the like in the switching system without an unnecessary operation of making a telephone call again in order to obtain information of other commodities with which an outsourcing company deals, thereby improving a service to the customer. Furthermore, even the outsourcing company will have less loss of a chance to acquire customers, leading to an enhanced business chance.

What we claim is:

1. A switching system comprising:
   a switch for connecting a first outside line through a public network to an extension/outside line, and
   a controller for connecting the first outside line to a second outside line when a transfer to the second outside line is demanded from the extension/outside line, and for controlling the switch so as to automatically reconnect the first outside line to the extension/outside line when a call between the first and the second outside lines ends.

2. The switching system as claimed in claim 1 wherein the controller detects the end of the call by a disconnection signal from the public network.

3. The switching system as claimed in claim 1 wherein if there are a plurality of extensions/outside lines the controller stores a number of an extension which has demanded the transfer, and selects the stored extension/outside line on reconnecting.

4. The switching system as claimed in claim 1 wherein if there are a plurality of extensions/outside lines the controller selects a predetermined one of the extensions/outside lines upon reconnection.

5. The switching system as claimed in claim 3 wherein when the selected extension/outside line is busy the controller selects another arbitrary extension/outside line which is not busy.

6. The switching system as claimed in claim 4 wherein when the selected extension/outside line is busy the controller selects another arbitrary extension/outside line which is not busy.

7. The switching system as claimed in any one of claim 1 wherein the extension/outside line comprises a reception desk in a call center where an operator is present.

8. The switching system as claimed in any one of claim 2 wherein the extension/outside line comprises a reception desk in a call center where an operator is present.

9. The switching system as claimed in any one of claim 3 wherein the extension/outside line comprises a reception desk in a call center where an operator is present.

10. The switching system as claimed in any one of claim 4 wherein the extension/outside line comprises a reception desk in a call center where an operator is present.

11. The switching system as claimed in any one of claim 5 wherein the extension/outside line comprises a reception desk in a call center where an operator is present.

12. The switching system as claimed in any one of claim 6 wherein the extension/outside line comprises a reception desk in a call center where an operator is present.

13. A switching system comprising:
   a switch for connecting a first line to a second line, and
   a controller for connecting the first line to a third line when a transfer to the third line is demanded from the second line, and for controlling the switch so as to reconnect the first line to the second line when a call between the first and the third lines ends.

14. The switching system as claimed in claim 13 wherein if there are a plurality of second lines the controller stores a number of a second line which has demanded the transfer, and selects the stored second line upon reconnection.

15. The switching system as claimed in claim 13 wherein if there are a plurality of second lines the controller selects a predetermined one of the second lines upon reconnection.

16. The switching system as claimed in claim 14 wherein when the selected second line is busy the controller selects another arbitrary second line which is not busy.

17. The switching system as claimed in claim 15 wherein when the selected second line is busy the controller selects another arbitrary second line which is not busy.

* * * * *